(12) United States Patent
Rich et al.

(10) Patent No.: US 7,137,114 B2
(45) Date of Patent: Nov. 14, 2006

(54) DYNAMICALLY TRANSFERRING LICENSE ADMINISTRATIVE RESPONSIBILITIES FROM A LICENSE SERVER TO ONE OR MORE OTHER LICENSE SERVERS

(75) Inventors: Marvin J. Rich, Poughkeepsie, NY (US); William K. Mellors, Clinton Corners, NY (US); Soon I. Joe, Hopewell Junction, NY (US); Ronald P. Checca, LaGrangeville, NY (US)

(73) Assignee: International Business Machines Corporation, Armonk, NY (US)

( * ) Notice: Subject to any disclaimer, the term of this patent is extended or adjusted under 35 U.S.C. 154(b) by 660 days.

(21) Appl. No.: 10/317,566

(22) Filed: Dec. 12, 2002

(65) Prior Publication Data

US 2004/0117467 A1 Jun. 17, 2004

(51) Int. Cl.
G06F 9/445 (2006.01)
G06F 9/44 (2006.01)
(52) U.S. Cl. ............... 717/174; 717/176; 709/203
(58) Field of Classification Search ........ 717/170–178; 707/203–204; 709/203
See application file for complete search history.

(56) References Cited

U.S. PATENT DOCUMENTS

| | | | | |
|---|---|---|---|---|
| 5,375,206 A | * | 12/1994 | Hunter et al. | 717/176 |
| 5,390,297 A | * | 2/1995 | Barber et al. | 726/29 |
| 5,438,508 A | * | 8/1995 | Wyman | 705/8 |
| 5,579,222 A | | 11/1996 | Bains et al. | 395/712 |
| 5,745,879 A | | 4/1998 | Wyman | 705/1 |
| 5,765,152 A | | 6/1998 | Erickson | 707/9 |
| 5,790,664 A | * | 8/1998 | Coley et al. | 709/203 |
| 6,056,786 A | | 5/2000 | Rivera et al. | 795/712 |
| 6,188,995 B1 | * | 2/2001 | Garst et al. | 705/59 |
| 6,189,146 B1 | | 2/2001 | Misra et al. | 717/11 |
| 6,260,141 B1 | | 7/2001 | Park | 713/155 |
| 6,289,452 B1 | | 9/2001 | Arnold et al. | 713/175 |
| 6,574,612 B1 | * | 6/2003 | Baratti et al. | 705/59 |
| 6,728,766 B1 | * | 4/2004 | Cox et al. | 709/220 |
| 6,842,896 B1 | * | 1/2005 | Redding et al. | 717/172 |
| 6,859,792 B1 | * | 2/2005 | Marjadi et al. | 705/59 |
| 6,889,376 B1 | * | 5/2005 | Barritz et al. | 717/175 |
| 6,898,706 B1 | * | 5/2005 | Venkatesan et al. | 713/167 |
| 6,918,113 B1 | * | 7/2005 | Patel et al. | 717/178 |
| 7,035,918 B1 | * | 4/2006 | Redding et al. | 709/223 |
| 7,080,051 B1 | * | 7/2006 | Crawford | 705/400 |

OTHER PUBLICATIONS

Lai et al, "Endorsement, licensing and insurance for distributed system services", ACM CCS, pp. 170-175, 1994.*
Bettadapur, "Software licensing modles in the EDA industry", IEEE, pp. 235-239, 1998.*
Junior et al, "A variability management process fro software product lines", ACM pp. 1-17, 2005.*
Hauser, "Does licensing requires new access control techniques?", ACM CCS, pp. 1-8, 1993.*

* cited by examiner

*Primary Examiner*—Anil Khatri
(74) *Attorney, Agent, or Firm*—Lawrence D. Cutter, Esq.; Blanche E. Schiller, Esq.; Heslin Rothenberg Farley & Mesiti P.C.

(57) ABSTRACT

At least a portion of the administrative responsibilities of one license server is transferred from the one license server to one or more other license servers. These responsibilities include the management of software licenses. This transfer is performed dynamically, such that vendor authorization, at the time of the transfer, is not needed. Further, the transfer of the administrative capabilities can occur prior to the expiration of the licenses being administered.

20 Claims, 14 Drawing Sheets

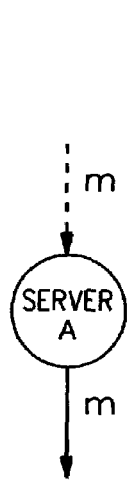 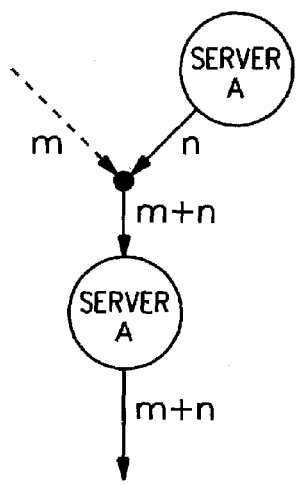 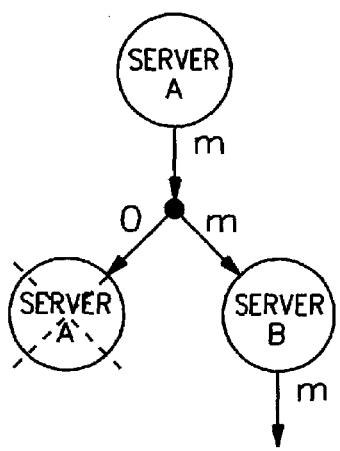
fig. 2A  fig. 2B  fig. 2C
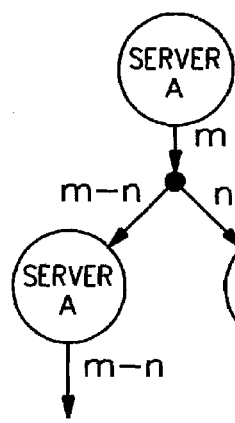 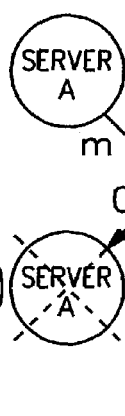 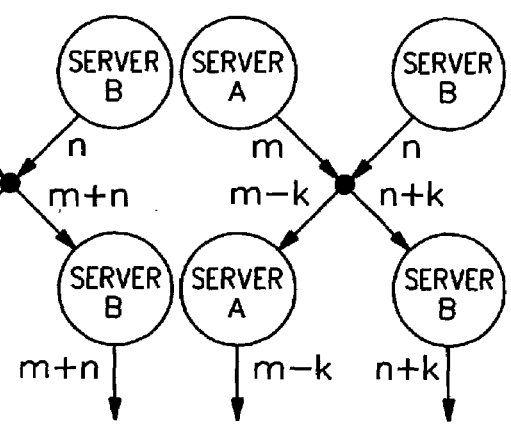
fig. 2D  fig. 2E  fig. 2F

DYNAMICALLY TRANSFERRING LICENSE ADMINISTRATIVE RESPONSIBILITIES FROM A LICENSE SERVER TO ONE OR MORE OTHER LICENSE SERVERS

TECHNICAL FIELD

This invention relates, in general, to employing license servers to administer software licenses, and in particular, to dynamically transferring at least a portion of the administrative responsibilities of one license server to one or more other license servers.

BACKGROUND OF THE INVENTION

Currently, software vendors limit the number of simultaneous users of a particular software application by issuing software licenses with agreed upon limits. Each license is a certificate, stored in a license file, that is used by a software access screening program, designated as the license server. The license server, which runs on a particular computer, grants users access to the software under the licenses, and manages the number of users currently running the software to ensure that the number of concurrent users does not exceed the maximum, as indicated in the license file.

Vendors protect their asset, which is the use of the software, by restricting use of the license file to a particular computer, as identified by its hardwired machine serial number. The vendor also ensures that only one copy of the license file is valid at any one time. This ensures that usage of the software asset is being managed from a license server using a single copy of the license file. Since the license management is tied to a particular machine, system management flexibility is severely impacted. Thus, if the license server goes down, due to a planned or unplanned event, this has the severe impact of bringing down all the licensed applications dependent on the license file of the license server.

In the case of a planned event, a licensee may request a new license file to be managed by another license server. However, vendors make the acquisition of new license files, which permit the switching of the license servers, a cumbersome process, in order to discourage the proliferation of licensed files that could be potentially utilized. Thus, for planned outages, there is a cumbersome technique available. However, for unplanned outages, not even this cumbersome technique is available.

Based on the foregoing, a need exists for a capability that facilitates switchover of license servers. In particular, a need exists for a capability that enables dynamic transfer of license administrative capabilities from one license server to one or more other license servers.

SUMMARY OF THE INVENTION

The shortcomings of the prior art are overcome and additional advantages are provided through the provision of a method of facilitating the transfer of license administrative responsibilities. The method includes, for instance, administering by one license server one or more licenses; and dynamically transferring from the one license server to another license server administrative responsibility for at least one license of the one or more licenses.

In one example, the dynamically transferring includes transferring the administrative responsibility absent renegotiation with a vendor of the at least one license of which license server is to administer the at least one license.

System and computer program products corresponding to the above-summarized methods are also described and claimed herein.

Additional features and advantages are realized through the techniques of the present invention. Other embodiments and aspects of the invention are described in detail herein and are considered a part of the claimed invention.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

FIGS. 2a–2f depict various state transitions that can occur, in accordance with an aspect of the present invention;

BEST MODE FOR CARRYING OUT THE INVENTION

In accordance with an aspect of the present invention, a capability is provided for facilitating the switchover of at least a part of the administrative responsibilities of one license server from the one license server to one or more other license servers. The administrative responsibilities include, for instance, management of one or more sets of licenses, each license set including one or more licenses.

The switchover includes, for instance, a transition from one license state to another license state. The license state reflects, at any instance in time, the number of licenses owned by each license server. A license state transition moves responsibility for one or more licenses from an initiating host to one or more receiving (or target) hosts.

Figure 1:
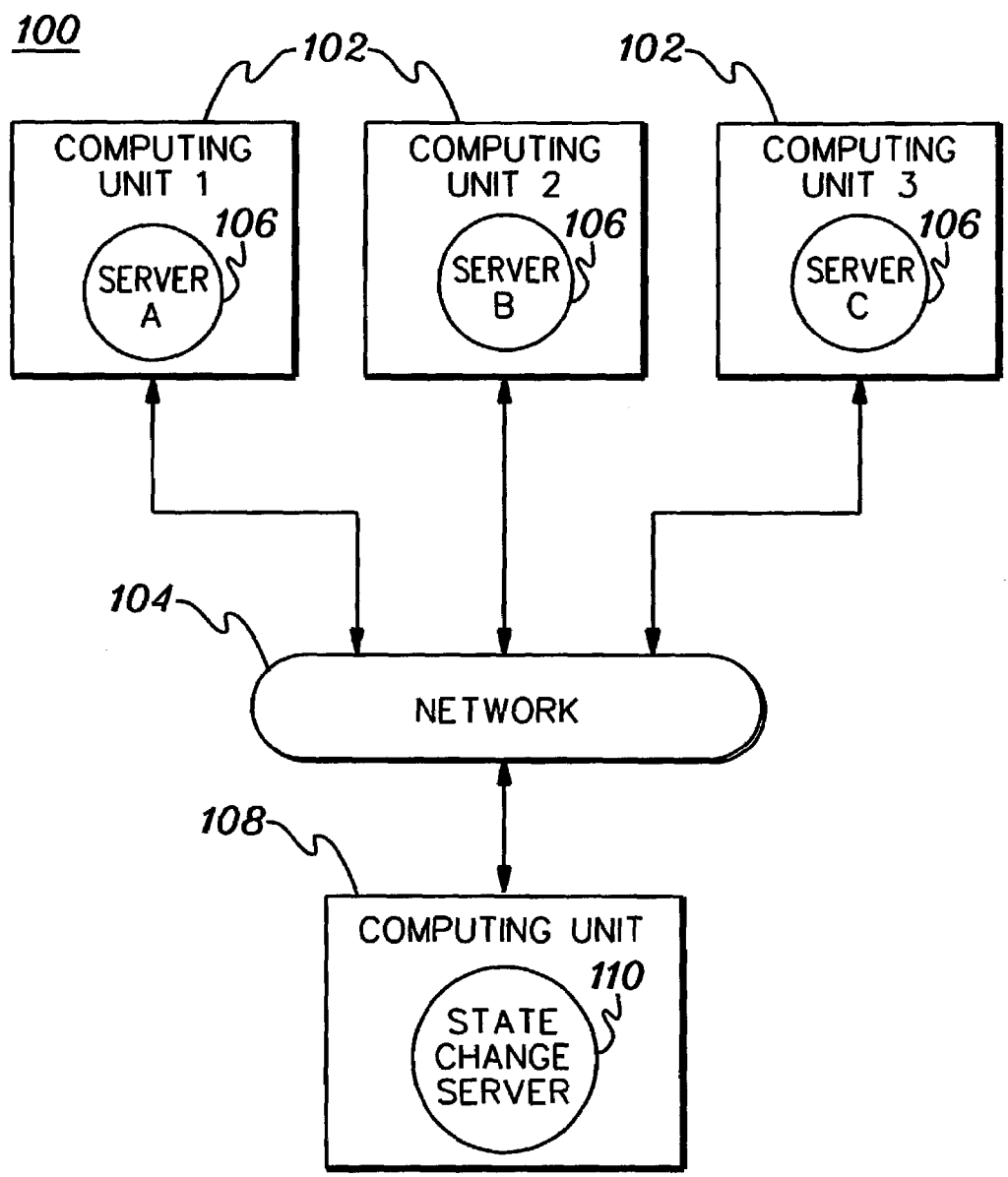
FIG. 1 depicts one embodiment of a computing environment incorporating and using one or more aspects of the present invention.

One embodiment of a computing environment incorporating and using one more aspects of the present invention is described with reference to FIG. 1. Computing environment 100 includes, for instance, a plurality of computing units 102 (e.g., hosts) coupled to one another via a network 104, such as a token ring, local area network (LAN), wide area network (WAN), the internet, or other network. As one example, a computing unit is an RS/6000, offered by International Business Machines Corporation, Armonk, N.Y. Other computing units may also be used.

One or more of the computing units include a license server 106 used to administer software licenses of the computing environment. A license server is, for example, license server code running on a host machine and exclusively owning zero or more licenses.

Also coupled to the network is a vendor's computing unit 108. Similar to computing units 102, computing unit 108 is one of various computing units, including, but not limited to, an RS/6000. Further, in another embodiment, the vendor's computing unit and the user's computing unit is one in the same. Computing unit 108 includes a state change server 110. The state change server is used to keep track of the state transitions and to acknowledge the same.

For example, in accordance with an aspect of the present invention, to effect a state transition, a change event message is sent to the state change server, which acknowledges receipt of the message. In response to the acknowledgement, the transition occurs. This ensures that the vendor knows of any changes. However, participation of the vendor is limited to this acknowledgment, thus, the transitioning (or switchover) is dynamic. No authentication or permission (e.g., to move the responsibility) is needed from the vendor, at the time of the transitioning.

With a set of state change event messages on the vendor's server, the vendor can construct and maintain a state transition history for a particular customer locally, with minimal network traffic delays or processing overhead. Also, the vendor can incorporate the desired security and redundancy used to maintain dynamic license allocation information without customer dependencies. The analysis of a customer's license state information need not be performed at the time of receipt of a license state change (although this is not precluded). At periodic intervals and at the vendor's convenience, the vendor can analyze the license state for a customer's account (if there has been a change, since the last analysis period) by, for instance, running one or more programs. Because the vendor acknowledges state change messages before a customer changes the state, the vendor can block further changes in license state at any time a discrepancy is detected.

The ability to switchover from one license server to one or more other license servers is based on the particular license server mode of operation requested by the customer. In accordance with an aspect of the present invention, various modes exist, including, for instance, the following:

1. Single static server mode: In this mode, a single license server is provided, which is bound to a particular host machine. This license server is responsible for administering one or more licenses. For example, as shown in FIG. 2a, License Server A receives m licenses and administers the same. In this mode, License Server A may also receive and administer additional licenses n, as shown in FIG. 2b.
2. Single dynamic server mode: In this mode, a single license server is relocated. That is, the administrative responsibilities of one license server are switched over to another license server. For example, as shown in FIG. 2c, the licenses initially administered by License Server A are now to be administered by License Server B.
3. Multiple dynamic server mode: In this mode, multiple license servers are allowed to administer one or more pools of licenses. For example, as shown in FIG. 2d, initially, License Server A administers m licenses. Then, a partial transfer occurs under the multiple dynamic server mode, and License Server A now administers m–n licenses and another server, License Server B, administers n licenses. In this mode, it is also possible that initially two license servers are administering one or more pools of licenses (see FIG. 2e). Then, a full merge occurs and one license server, License Server A, does not administer any of the licenses, but instead, License Server B administers those licenses, as well as its own. In yet another example, a partial merge occurs, in which administration of some of the licenses of License Server A is switched over to License Server B, which is already administering its own licenses, as shown in FIG. 2f.

Each license server mode is mutually exclusive, in one embodiment, such that the license server software is set up to execute in one particular mode, at a given time. The license server mode of operation is based on the license purchase agreement. It gives the vendor the option to enable one of the modes of functionality for a pool (or set) of licenses, based on the purchase agreement. The functionality is priced according to the features provided by the mode of operation.

Since a pricing strategy applies to the license server mode of operation, the dynamic transfer of license administration is performed between license servers with compatible license server modes. Therefore, in this embodiment, a transfer of license administration from a license server in single dynamic (SD) mode is not allowed to a license server running in multiple dynamic (MD) mode. This avoids promotion or deprecation of license function, which would introduce capabilities that would be inconsistent with original purchased agreements. In other embodiments, however, the dynamic transfer can be performed between license servers with incompatible modes (e.g., for an enhanced fee).

The particular mode of operation enabled by the vendor under agreement with the user is indicated in a license file associated with the server. The license file is used to protect the vendor asset (e.g., the licensed software) from misuse. It is used to ensure that a particular license can be administered from only one server at any given time. In one embodiment, the license file includes, for instance, the following fields: a machine serial number identifying the host associated with the license file; the number of licenses in each license set to at least initially be administered by the host (a license set includes one or more licenses for a given component (e.g., application) to expire concurrently); for each license set, the time at which the license set expires; a single dynamic server mode flag indicating whether this mode is available; a multiple dynamic server mode flag indicating whether this mode is available; a static mode expiration indicating an amount of time licenses are locked to this server before a dynamic mode of operation can be entered; and a dynamic encryption key, providing a symmetric key for dynamic license files (a suffix to the license file name indicates when the dynamic encryption key is used).

A dynamic license file is a file created by a particular target host, instead of being provided by the vendor. The file is created from information passed to the target host by an initiating host. In one example, a dynamic license file is created for one or more licenses subsequent to invalidating the already created license file for those licenses. This ensures that only one valid license file exists for a particular set of licenses.

In one embodiment, some fields of the license file (irrespective of creation) are shown in plain text for human readable information purposes, and some are encrypted to protect from alteration. The encrypted fields are used by the license server code. To access the license file from the vendor, asymmetric public/private key encryption techniques are used.

In accordance with an aspect of the present invention, a dynamic license server mode that is enabled can be entered, after a customer specified amount of time in which the licenses are bound to a particular license server, as in the single static mode, has expired (i.e., static mode expiration). After the time period expires, no valid license file is in existence that could be used to start another pool of licenses. The current license server is then allowed to enter a dynamic license server mode, where under user command or automatic invocation, license administration is allowed to be transferred to one or more other license servers. After the transfer is complete, single static mode can be entered at the target host (and/or the initiating host). In one example, in response to entering the single static mode, a dynamic license file can be created.

The transferring of administrative responsibility from one license server to one or more other license servers is facilitated by a plurality of operations that are issued by a user or automatically entered based on an event. In one example, these operations are parameters to a command, referred to as an LSRVR command. The LSRVR command directs the information to the active license server code running on the machine in which the command is issued. In one embodiment, the parameters include the following:

1) LSRVR start<lic_file>: The license server code is started with a particular license file.
2) LSRVR start null: The license server code is started with no license file.
3) LSRVR strt_merge<lic_file>: Add new licenses to an active server code instance.
4) LSRV shutdown: Shutdown the license server.
5) LSRVR xfer <hostb>: Transfer all licenses to a new host server code instance.
6) LSRVR pxfer #lic<hostb>: Transfer #lic licenses to a new host server code instance.
7) LSRVR lock: Lock the server code in single static mode.
8) LSRVR unlock: Allow server code to transition to dynamic mode. In one example, this transition can occur, after expiration of the static mode expiration timer.

The lock and unlock parameters are used to control the time that the license servers are in the dynamic mode of operation, where no valid license file exists. Utilizing these commands, the user can lock responsibility of the licenses to a particular server host machine, and then unlock it, when a transfer of license responsibility is desired. After the transfer is complete, the user can lock responsibility of the licenses to the target host, such that a valid license file can be in existence, again. Further, the server code of the initiating host can also be locked, once again.

Figure 3A:
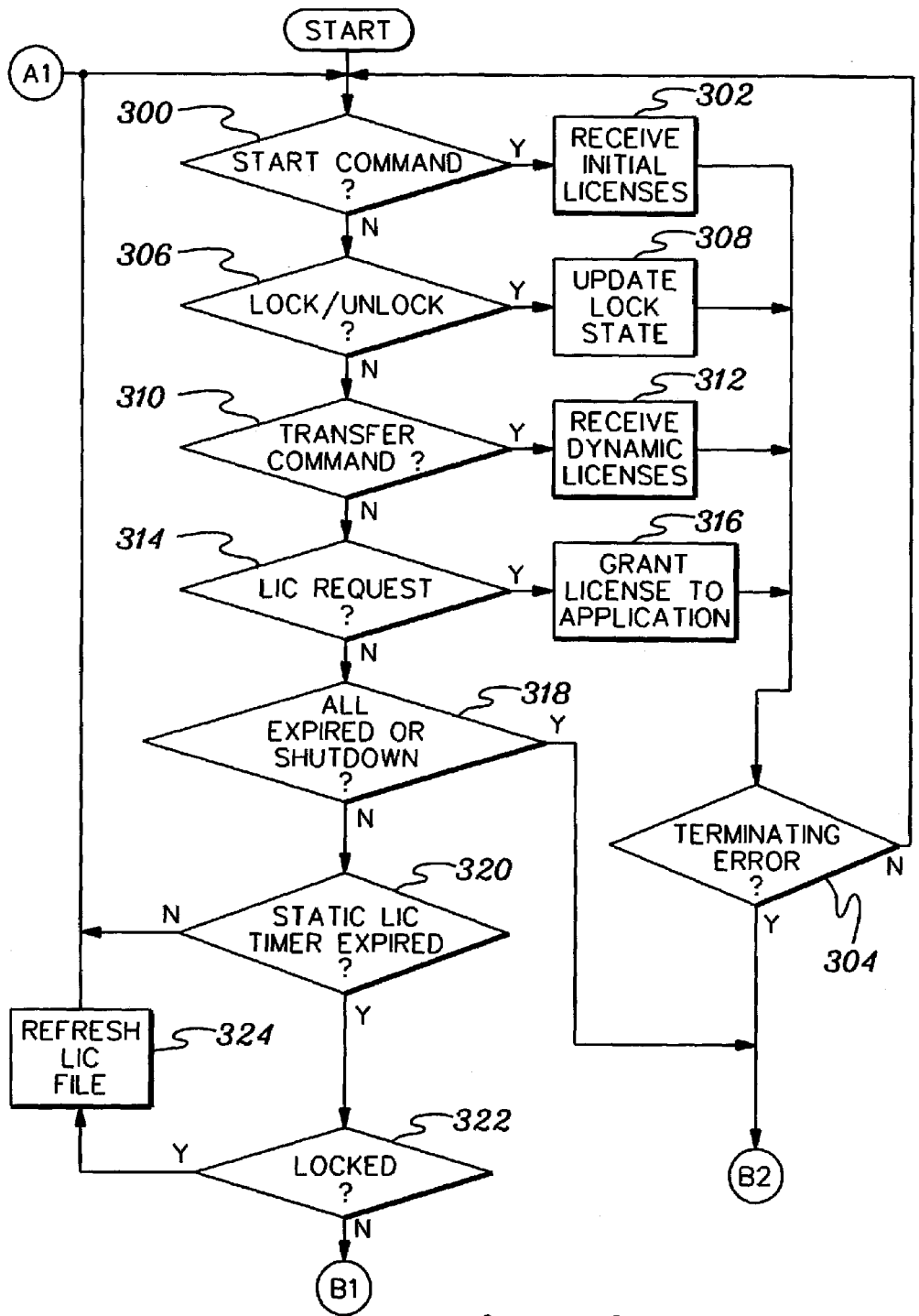
FIGS. 3a–3b depict an overview of the logic associated with dynamically transferring license administrative responsibilities from a license server to one or more other license servers, in accordance with an aspect of the present invention.
Figure 3B:
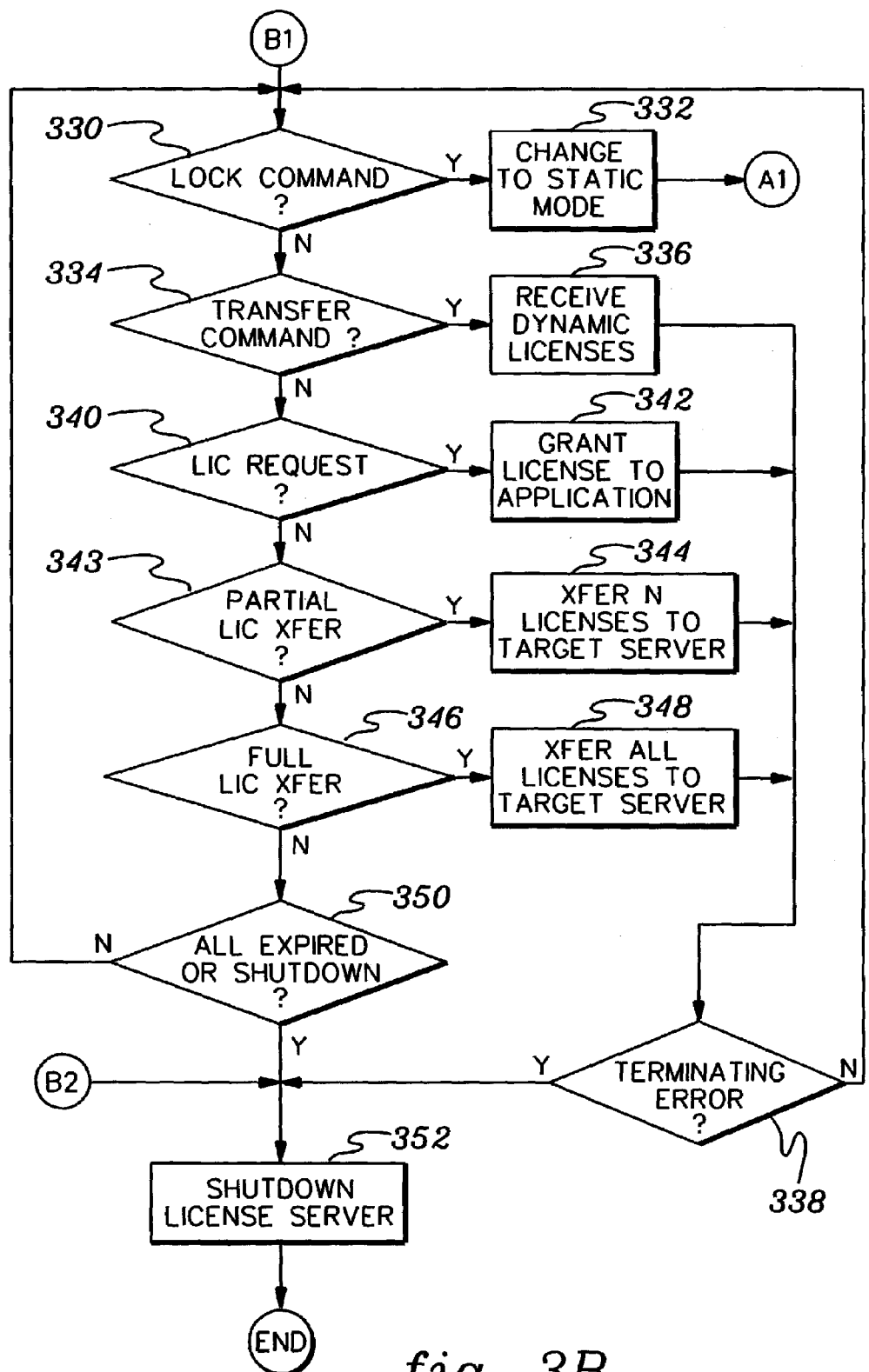

One embodiment of the logic associated with switching over administrative responsibility of one or more licenses from one license server to one or more other license servers, in accordance with an aspect of the present invention, is described with reference to FIGS. 3a–3b. In particular, FIG. 3a is associated with processing during a static mode of operation, and FIG. 3b is associated with processing during a dynamic mode of operation. A main difference between the static mode of operation and the dynamic mode of operation is the ability to initiate the transfer of license ownership in dynamic mode, versus locking the licenses to a server in static mode. In one example, the logic is part of the server code.

Referring initially to FIG. 3a, in response to a command being received on a computing unit, a determination is made as to the type of command. For instance, a check is made as to whether the command is a start command, INQUIRY 300. That is, is the command a type of a LSRVR start command, as one example. If this is a start command, then "Receive Initial Licenses" is processed, STEP 302. One embodiment of the logic associated with "Receive Initial Licenses" is described with reference to FIGS. 4a–4c.

Figure 4A:
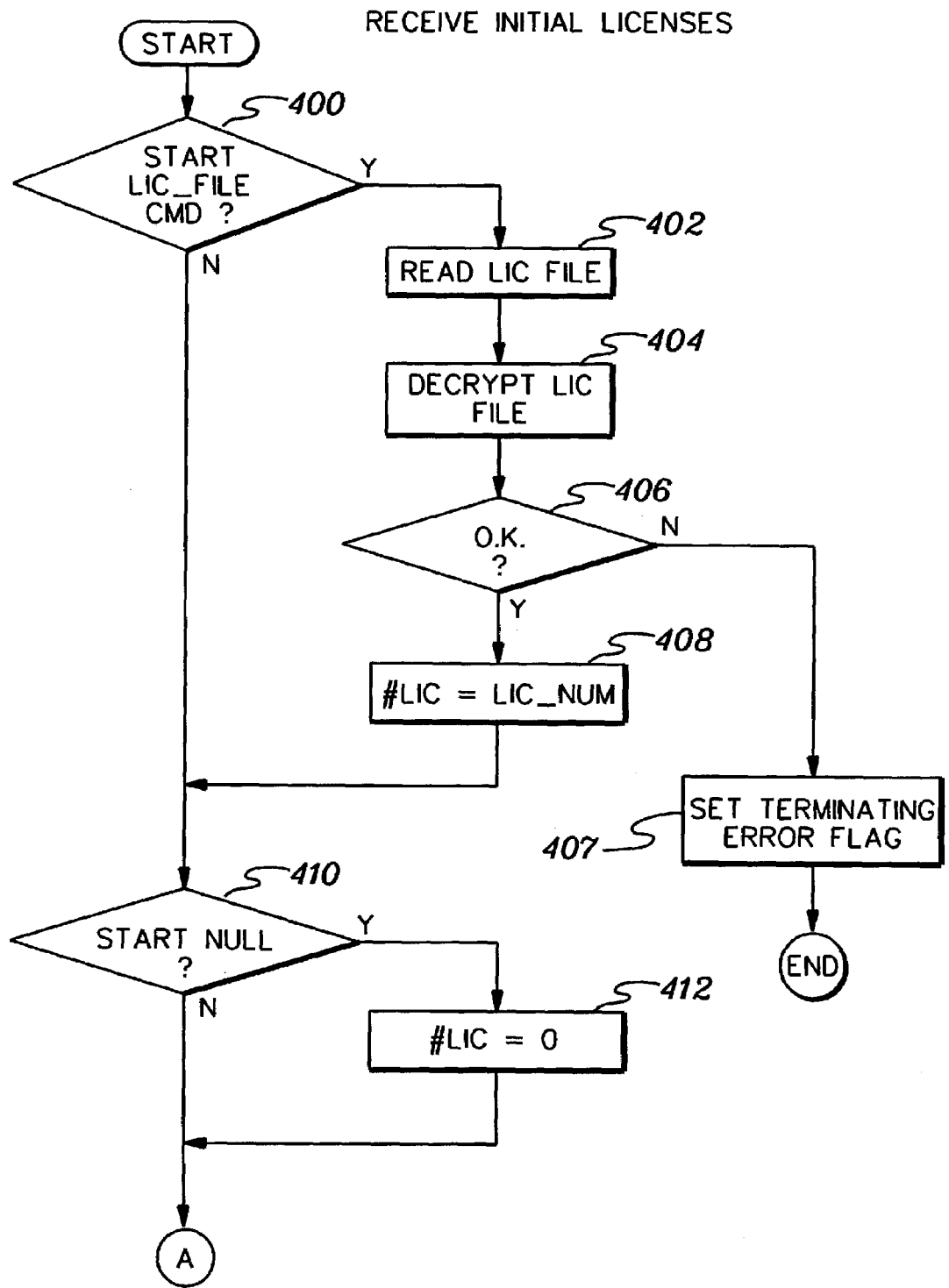
FIGS. 4a–4c depict one embodiment of the logic associated with receiving initial licenses, in accordance with an aspect of the present invention.

Referring to FIG. 4a, initially a determination is made as to the type of start command. For example, a determination is made as to whether the command is a LSRVR start<lic_file> command, INQUIRY 400. Should the command be a start<lic_file> command, then the designated license file is read, STEP 402, and decrypted using standard decryption techniques, STEP 404. If this processing results in an error, INQUIRY 406, then a terminating error flag is set, STEP 407, and processing is complete. Otherwise, a variable, referred to as #lic, is set equal to the lic_num obtained from the license file, STEP 408. For example, lic_num reflects a sum of the number of licenses in the sets represented in the license file. Thereafter, or if the command is not a start<lic_file> command, then a further determination is made as to whether the command is a start null command, INQUIRY 410. If so, then the variable #lic is set equal to zero, STEP 412.

Figure 4B:
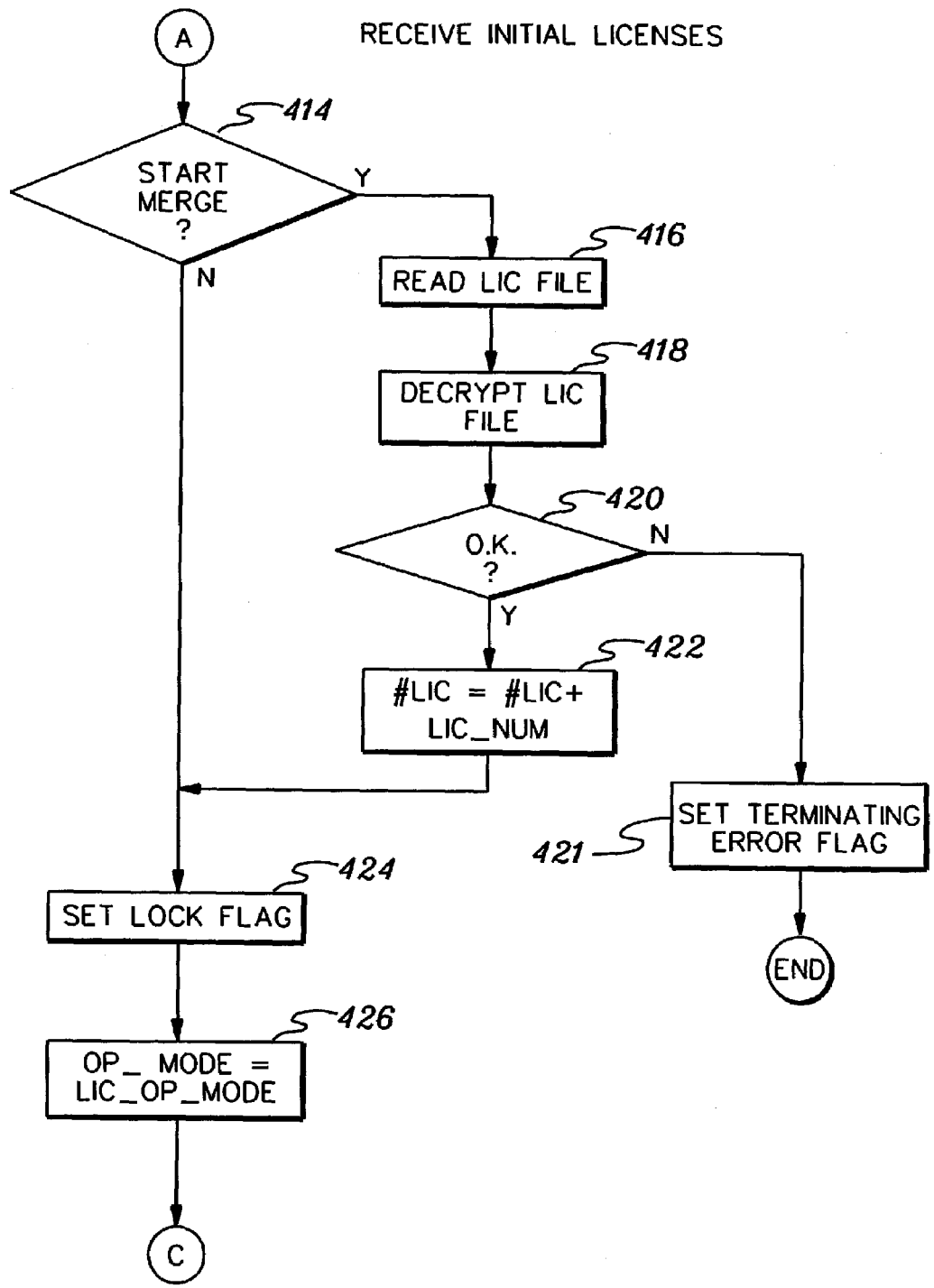

Subsequent to setting #lic=0, or if the command is not a start null command, then a further determination is made as to whether this is a start merge command (e.g., LSRVR strt_merge<lic_file>), INQUIRY 414 (FIG. 4b). Should this be a start merge command, then the license file is read, STEP 416, and decrypted, STEP 418. Again, if this processing results in an error, INQUIRY 420, then a terminating error flag is set, STEP 421, and processing is complete. Otherwise, #lic is set equal to #lic+lic_num, STEP 422. Thereafter, or if it is not a start merge command, then a lock flag located within the server code is set to indicate that the current operating mode is single static server mode, STEP 424. Additionally, a variable, referred to as op_mode, is set equal to lic_op_mode, which is determined from the license file and indicates the mode purchased from the vendor, STEP 426.

Figure 4C:
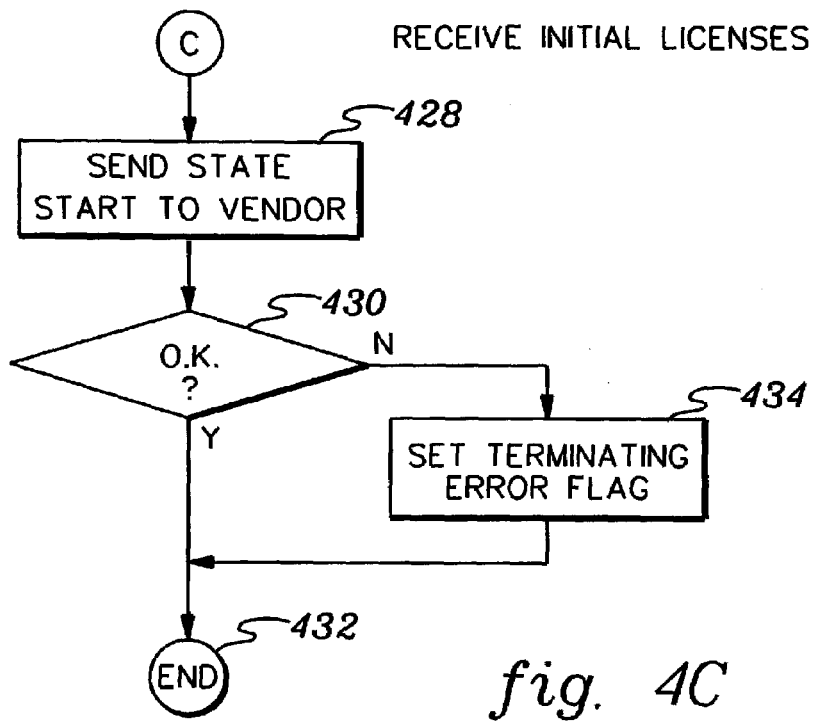

Subsequently, the vendor is informed of the start, by forwarding an event change message to the vendor, STEP 428 (FIG. 4c). In one example, each event message includes the time of the message and the type of event (e.g., a start). If a valid acknowledgment is received from the vendor, INQUIRY 430, then processing is complete, STEP 432. However, if a valid acknowledgment is not received, then the terminating error flag is set, STEP 434.

Returning to FIG. 3a, subsequent to processing the "Receive Initial Licenses" logic, a determination is made as to whether a terminating error was generated, STEP 304. If not, then processing continues with INQUIRY 300, in which the logic polls for another command.

At INQUIRY 300, if the entered command is not a start command, then an inquiry is made as to whether the command is a lock/unlock command, INQUIRY 306. Should the command be a lock/unlock command, then the lock state is updated, STEP 308. One embodiment of the logic associated with updating the lock state is described with reference to FIG. 5.

Figure 5:
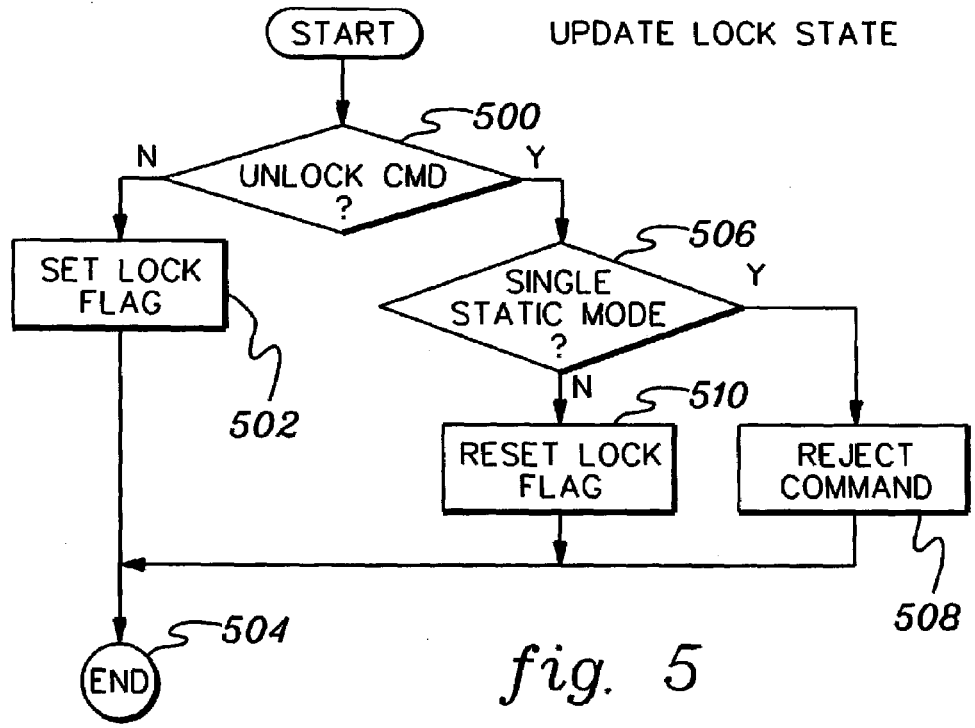
FIG. 5 depicts one embodiment of the logic associated with updating a lock state, in accordance with an aspect of the present invention.

Referring to FIG. 5, initially, a determination is made as to whether the received command is an unlock command, INQUIRY 500. If it is not an unlock command, then the lock flag is set, ensuring that administration of the licenses is in a single static mode, STEP 502, and processing is complete, STEP 504. However, if the command is an unlock command, then a further determination is made as to whether the selected mode for this license server, as designated by an enable bit in the license file, is single static mode, INQUIRY 506. If it is single static mode, then the command is rejected, STEP 508, and processing is complete. This is because licenses are to be locked to a particular server host, when in single static mode. However, if it is not single static mode, then the lock flag is reset, STEP 510. This concludes processing of the update lock state.

Returning to FIG. 3a, after the update lock state processing is complete, a determination is made as to whether the processing produced a terminating error, INQUIRY 304. If not, then processing continues with INQUIRY 300.

If the command received is not a start command or a lock/unlock command, then a determination is made as to whether the command is a transfer command, INQUIRY 310. If the command is some sort of transfer command (e.g., full or partial transfer), then "Receive Dynamic Licenses" is processed, STEP 312. One embodiment of the logic associated with "Receiving Dynamic Licenses" is described with reference to FIG. 6.

Figure 6:
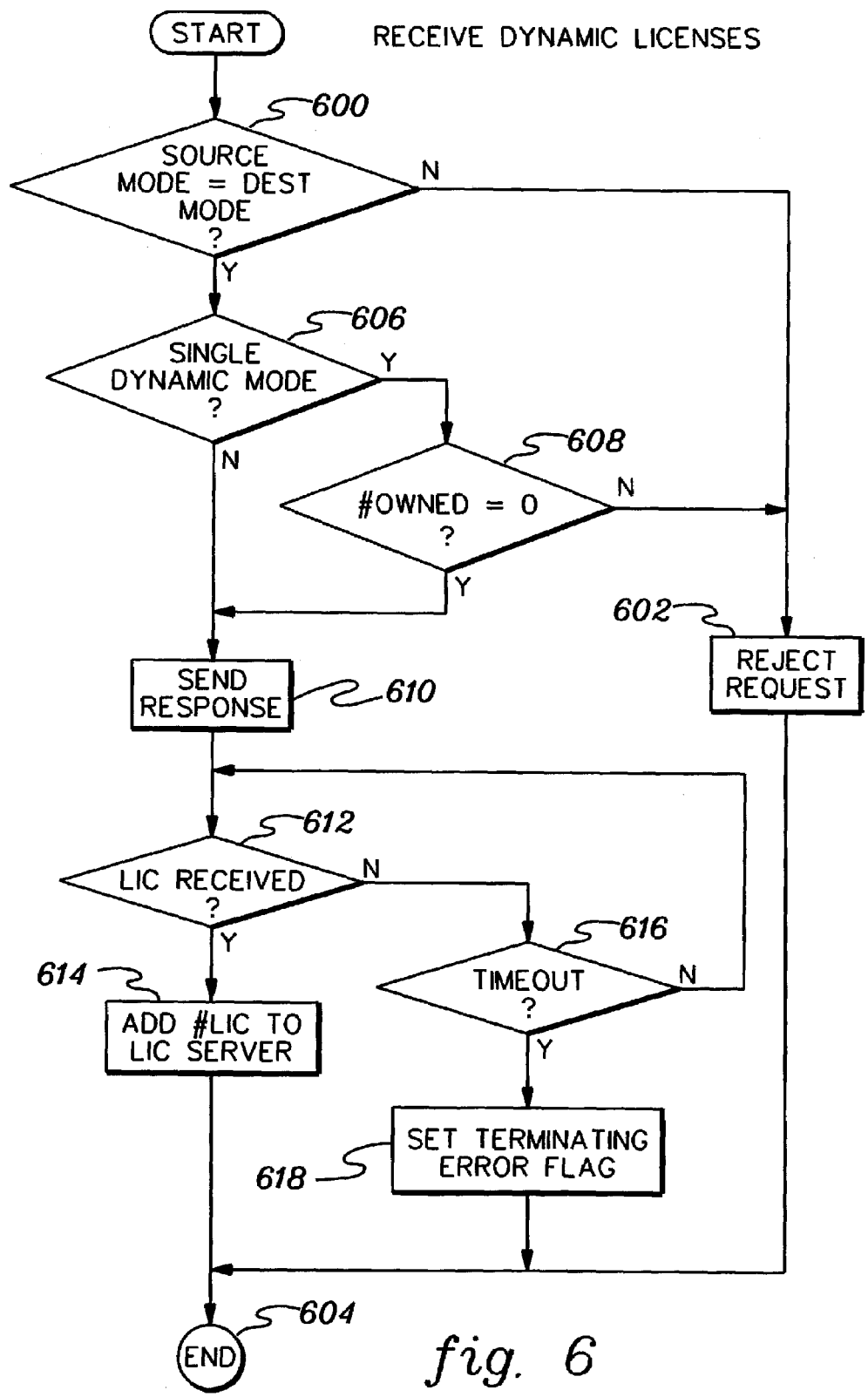
FIG. 6 depicts one embodiment of the logic associated with receiving dynamic licenses, in accordance with an aspect of the present invention.

Referring to FIG. 6, initially, a determination is made as to whether the source mode is equal to the destination mode, INQUIRY 600. That is, is the operating mode of the source license server compatible with the operating mode of the destination license server. This is determined by the receiving host comparing the enable bit in its license file with the enable bit forwarded by the initiating host. If the modes are not compatible, then the request is rejected, STEP 602, and processing of the "Receive Dynamic Licenses" logic is complete, STEP 604. However, if the source mode is equal to the destination mode, then a further determination is made as to whether the mode is single dynamic mode, INQUIRY 606. If it is single dynamic mode, then a further determination is made as to whether the number of licenses owned by the destination node is equal to zero, INQUIRY 608. If not, then the request is rejected, STEP 602, since in single dynamic mode, only one license server is allowed to be administering the given licenses exclusively. However, if the number of owned licenses is equal to zero, or if the operating mode is not a single dynamic mode, then a response is sent to the source node to allow the license transfer to take place, STEP 610.

Thereafter, a determination is made as to whether information for one or more licenses is received by the destination node from the source node, INQUIRY 612. If the information is received, then #lic is added to the license server of the destination node, STEP 614, and processing is complete. However, if the license information is not received, then a determination is made as to whether there has been a timeout, INQUIRY 616. If not, processing continues with INQUIRY 612 "Lic Received?". Otherwise, if a timeout threshold has been reached, then the terminating error flag is set, STEP 618.

Returning to FIG. 3a, after processing "Receive Dynamic Licenses", a determination is made as to whether a terminating error was generated, INQUIRY 304. If not, then processing continues once again with INQUIRY 300.

At INQUIRY 300, if the command is not a start, lock/unlock or a transfer command, then a further determination is made as to whether the command is a request by an application for a license, STEP 314. If so, then "Grant License to Application" is processed, STEP 316. One embodiment of the logic associated with "Granting License to Application" is described with reference to FIG. 7.

Figure 7:
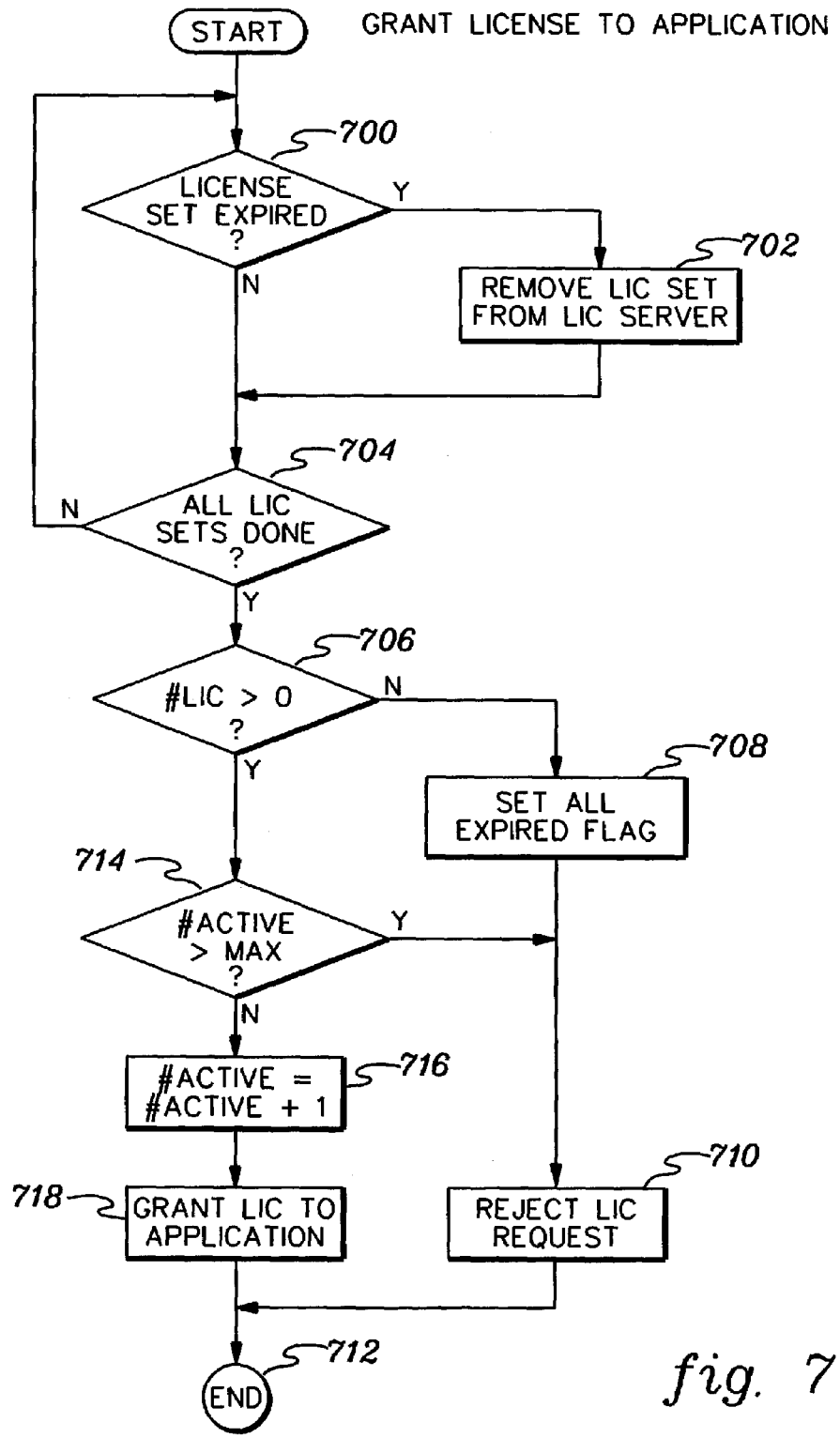
FIG. 7 depicts one embodiment of the logic associated with granting a license to an application, in accordance with an aspect of the present invention.

Referring to FIG. 7, initially, a determination is made as to how many licenses are currently valid on the license server receiving this request. Thus, a license set of the server is selected and an inquiry is made as to whether the license set has expired, INQUIRY 700. In one example, this is determined from the license file. If the license set has expired, then the license set is removed from the license server, STEP 702. Thereafter, or if the license set has not expired, then a further determination is made as to whether the expirations of all the license sets have been checked, INQUIRY 704. If there are remaining license sets to be checked, then processing continues with INQUIRY 700 "License Set Expired?". Otherwise, a further check is made as to whether #lic for this license server is greater than zero, INQUIRY 706. If #lic is not greater than zero, then an all expired flag in the server code is set, STEP 708, indicating that no licenses can be granted at this time, since the license sets have expired. Additionally, the license request is rejected, STEP 710, and processing ends, STEP 712.

Returning to INQUIRY 706, if #lic is greater than zero, then a further determination is made as to whether the number of active licenses (#active), as indicated in the server code, is greater than a variable, referred to as max, designating the maximum number of active licenses to be granted, INQUIRY 714. Should the number of active licenses be greater than max, then again, the license request is rejected, STEP 710. Otherwise, #active is incremented, STEP 716, and the license is granted to the application, assuming the license is of a set that has not expired, STEP 718.

Returning to FIG. 3a, if processing of "Grant License to Application" did not produce a terminating error, INQUIRY 304, then processing continues with INQUIRY 300 "Start Command?". If the received command is not a start command, a lock/unlock command, a transfer command or a license request, then a further determination is made as to whether all of the licenses have expired or whether this is a shut down command, INQUIRY 318. If all the licenses have not expired and this is not a shut down command, then a further inquiry is made as to whether the static license timer has expired, INQUIRY 320. If the static license timer has not expired, then processing continues with INQUIRY 300 "Start Command?". However, if the static license timer has expired, then processing in dynamic mode may be enabled.

Initially, an inquiry is made as to whether responsibility of the licenses is locked to a particular server, INQUIRY 322. If so, then the license file is refreshed, STEP 324. One embodiment of the logic associated with refreshing the license file is described with reference to FIG. 8.

Figure 8:
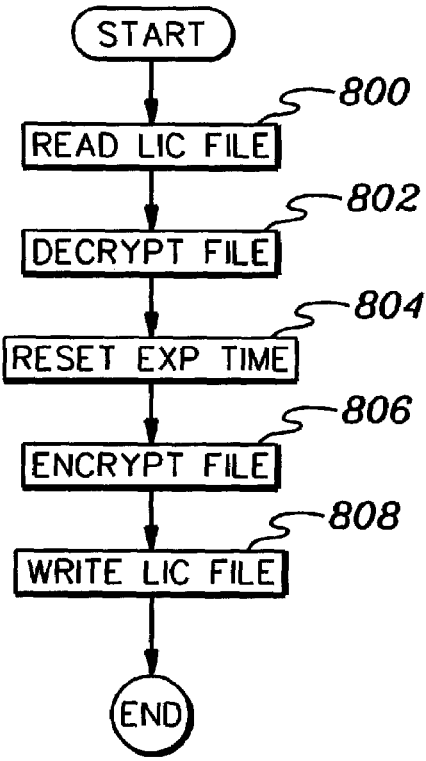
FIG. 8 depicts one embodiment of the logic associated with refreshing a license file, in accordance with an aspect of the present invention.

Referring to FIG. 8, initially, the license file is read, STEP 800, and decrypted, STEP 802. Then, the expired time is reset, STEP 804, and the file is encrypted, once again, STEP 806. The license file is subsequently written to storage media, such as disk, STEP 808. After the license file is refreshed, processing continues with INQUIRY 300 "Start Command?" (FIG. 3a), since processing is to continue in single static mode.

Returning to INQUIRY 322, if responsibility of the licenses is not locked to a particular server, then processing continues in dynamic server mode. This processing is described with reference to FIG. 3b, in which the logic is polling waiting for a command to be entered.

At INQUIRY 330 of FIG. 3b, a determination is made as to whether a received command is a lock command. If it is a lock command, then a change is made back to static mode, STEP 332. One embodiment of the logic associated with changing to static mode is described with reference to FIG. 9.

Figure 9:
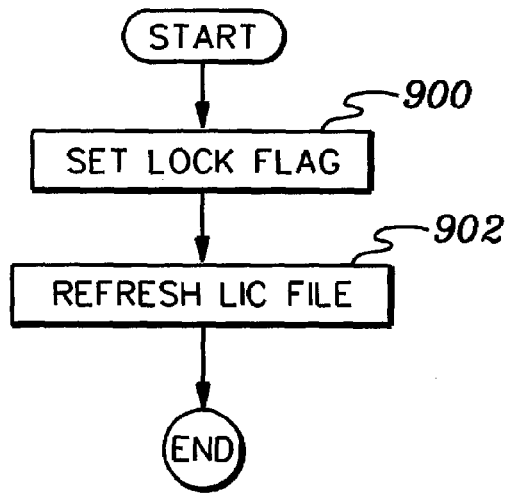
FIG. 9 depicts one embodiment of the logic associated with changing from dynamic mode to static mode, in accordance with an aspect of the present invention.

Referring to FIG. 9, in order to change to static mode, the lock flag is set, STEP 900, and the license file is refreshed, as described above with reference to FIG. 8, STEP 902. This completes the change to static mode. After changing to static mode, processing continues with INQUIRY 300 "Start Command?" (FIG. 3a).

Returning to FIG. 3b, if this is not a lock command, then a further determination is made as to whether it is a transfer command, INQUIRY 334. If it is a transfer command, then "Receive Dynamic Licenses" is processed, as described above, STEP 336. If processing of the "Receive Dynamic Licenses" logic does not indicate a terminating error, INQUIRY 338, then processing continues with INQUIRY 330 "Lock Command?".

If the received command is not a lock command or a transfer command, then a further determination is made as to whether it is a license request, INQUIRY 340. Should it be a license request, then "Grant License to Application" is processed, as described herein, STEP 342. Again, if that processing does not end in a terminating error, INQUIRY 338, then processing continues with INQUIRY 330 "Lock Command?".

If the command is not a lock command, a transfer command or a license request, then a further inquiry is made as to whether it is a partial license transfer, INQUIRY 343. If it is a partial license transfer, then "Xfer n licenses to Target Server" is processed, STEP 344. One embodiment of the logic associated with the transfer processing is described with reference to FIG. 10.

Figure 10:
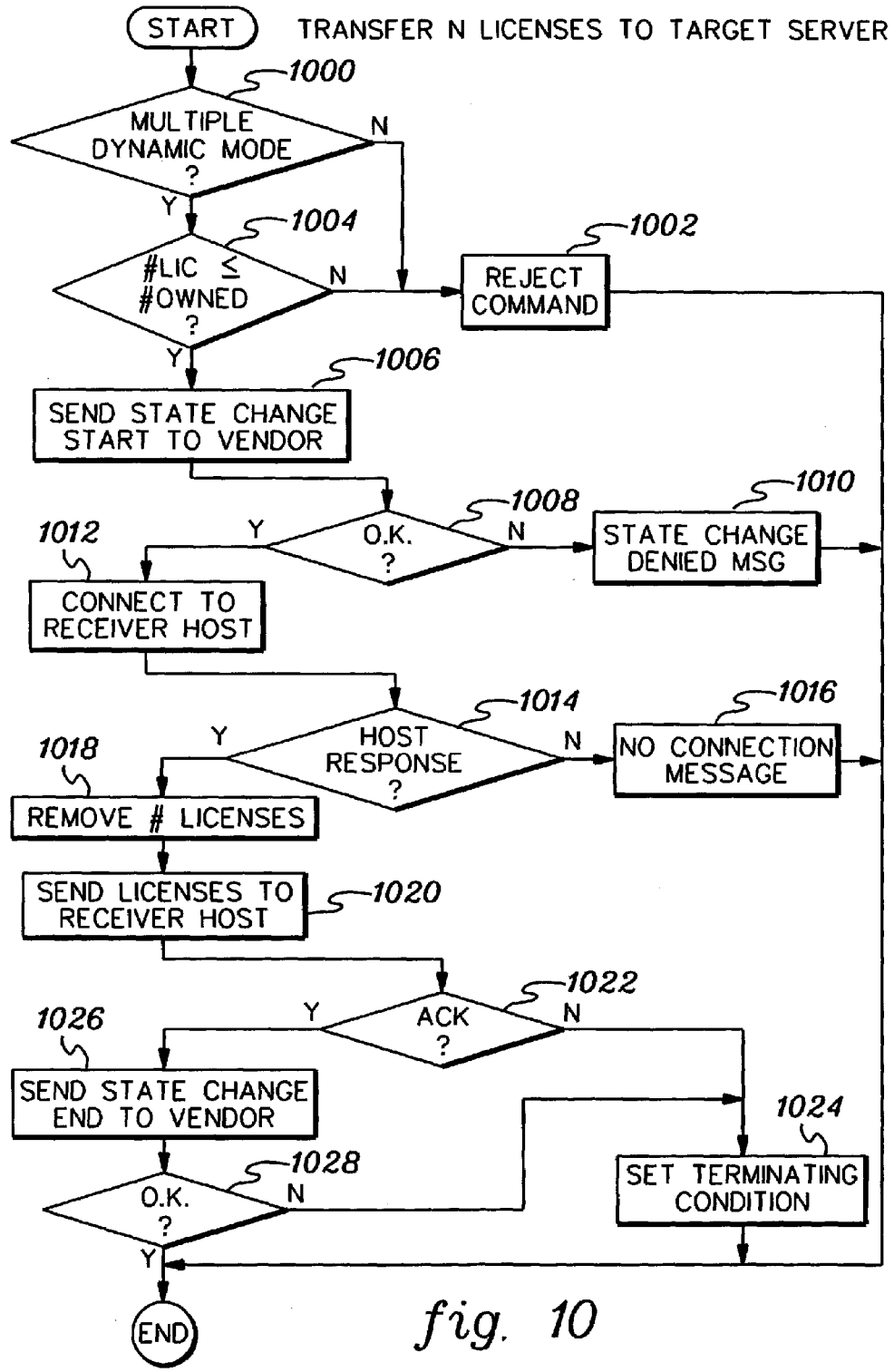
FIG. 10 depicts one embodiment of the logic associated with transferring n licenses to a target server, in accordance with an aspect of the present invention.

Referring to FIG. 10, initially, a determination is made as to whether multiple dynamic mode is enabled, INQUIRY 1000. If not, then the command is rejected, since there cannot be multiple servers administering a license set, STEP 1002, and processing is complete. However, if multiple dynamic mode is enabled, then a further determination is made as to whether #lic for which responsibility is to be transferred is less than or equal to the number of licenses owned (i.e., #owned), INQUIRY 1004. If not, then the command is rejected, since the initiating host is attempting to transfer responsibility for more licenses than it owns, STEP 1002. This completes processing.

If, on the other hand, the #lic is less than or equal to #owned, then the vendor is informed of the state change by, for instance, sending a state change event message indicating the start of a state change to the vendor, STEP 1006. If an acknowledgment is not received by the transferor, INQUIRY 1008, then a state change denied message is issued to the initiating host, STEP 1010, and processing is complete. However, if an acknowledgment is received, then a connection to the receiver host is attempted, STEP 1012.

Should the receiver host fail to respond, INQUIRY 1014, then a no connection message is issued to the transferor, STEP 1016, and processing is complete. Otherwise, if the receiver host responds, then responsibility for the desired number of licenses is removed from the initiating host, STEP 1018, and sent to the receiver host, STEP 1020. In one example, this includes sending information regarding those licenses (e.g., information in the license file, such as, type of license, expiration date, etc.) used to administer the licenses from the initiating host to the receiver host over the network using TCP/IP and standard encryption/decryption techniques, such as RSA.

Thereafter, a determination is made as to whether there has been an acknowledgment by the receiver host of the forwarded information, INQUIRY 1022. If not, then a terminating condition is set, STEP 1024, and processing is complete. However, if there has been an acknowledgment, then a state change end message is sent to the vendor, STEP 1026. If the vendor acknowledges this change event, INQUIRY 1028, then processing is complete. If not, then a terminating condition is set, STEP 1024, and processing is complete.

Returning to FIG. 3b, after processing the transfer logic, a determination is made as to whether the processing generated a terminating error, INQUIRY 338. If not, then processing continues with INQUIRY 330 "Lock Command?".

Figure 11:
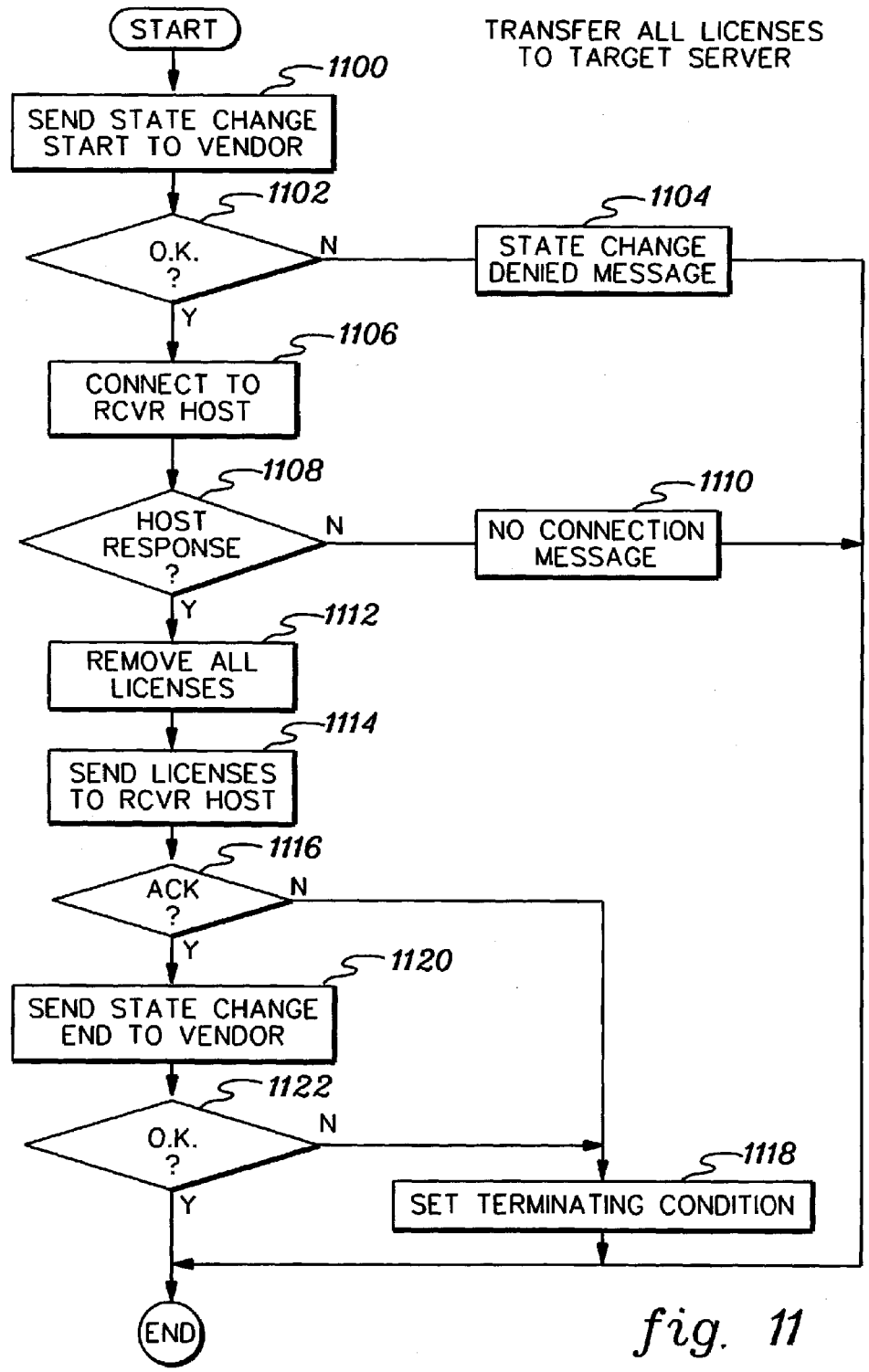
FIG. 11 depicts one embodiment of the logic associated with transferring all the licenses of an initiating server to a target server, in accordance with an aspect of the present invention.

At INQUIRY 330, if the command is not a lock command, a receive transfer command, a license request or a partial license transfer, then a further determination is made as to whether it is a full license transfer, INQUIRY 346. If so, then "Xfer All Licenses to Target Server" is processed, STEP 348. One embodiment of the logic associated with transferring responsibility of all the licenses to the target server is described with reference to FIG. 11.

Initially, a state change start event message is sent to the vendor, STEP 1100. If the vendor does not acknowledge this change event, INQUIRY 1102, then a state change denied message is issued to the initiating host, STEP 1104, and processing is complete. However, if the state change start event message is acknowledged, then a connection to the receiver host is attempted, STEP 1106. If the receiver host does not respond, INQUIRY 1108, then a no connection message is issued to the initiating host, STEP 1110, and processing is complete. On the other hand, if the receiver host does respond, then responsibility for all the licenses of the initiating host is removed from the initiating host, STEP 1112, and forwarded to the receiving host, STEP 1114. In one example, this includes sending from the initiating host to the receiving host information regarding the licenses (e.g., information in the license file, such as type of license, expiration date, etc.) that is used to administer the licenses.

Subsequently, a determination is made as to whether there has been an acknowledgement from the receiver host, INQUIRY 1116. If not, then a terminating condition is set, STEP 1118, and processing is complete. However, if an acknowledgment has been received, then a state change end event message is sent to the vendor, STEP 1120. If that change event is not acknowledged, then a terminating condition is set, STEP 1118. Thereafter, or if the event is acknowledged, then processing is complete.

Returning to FIG. 3b, should processing of the "Xfer ALL Licenses To Target Server" not generate a terminating error, INQUIRY 338, then processing continues with INQUIRY 330.

If the received command is not a lock command, a transfer command, a license request, a partial license transfer or a full license transfer, then a further determination is made as to whether all the licenses have expired or whether this is a shut down command, INQUIRY 350. If not, then processing continues with INQUIRY 330 "Lock Command?". If so (INQUIRIES 350 and 318), or if there has been a terminating error, INQUIRIES 338 and 304, then the license server is shut down, STEP 352. One embodiment of the logic associated with shutting down the license server is described with reference to FIG. 12.

Figure 12:
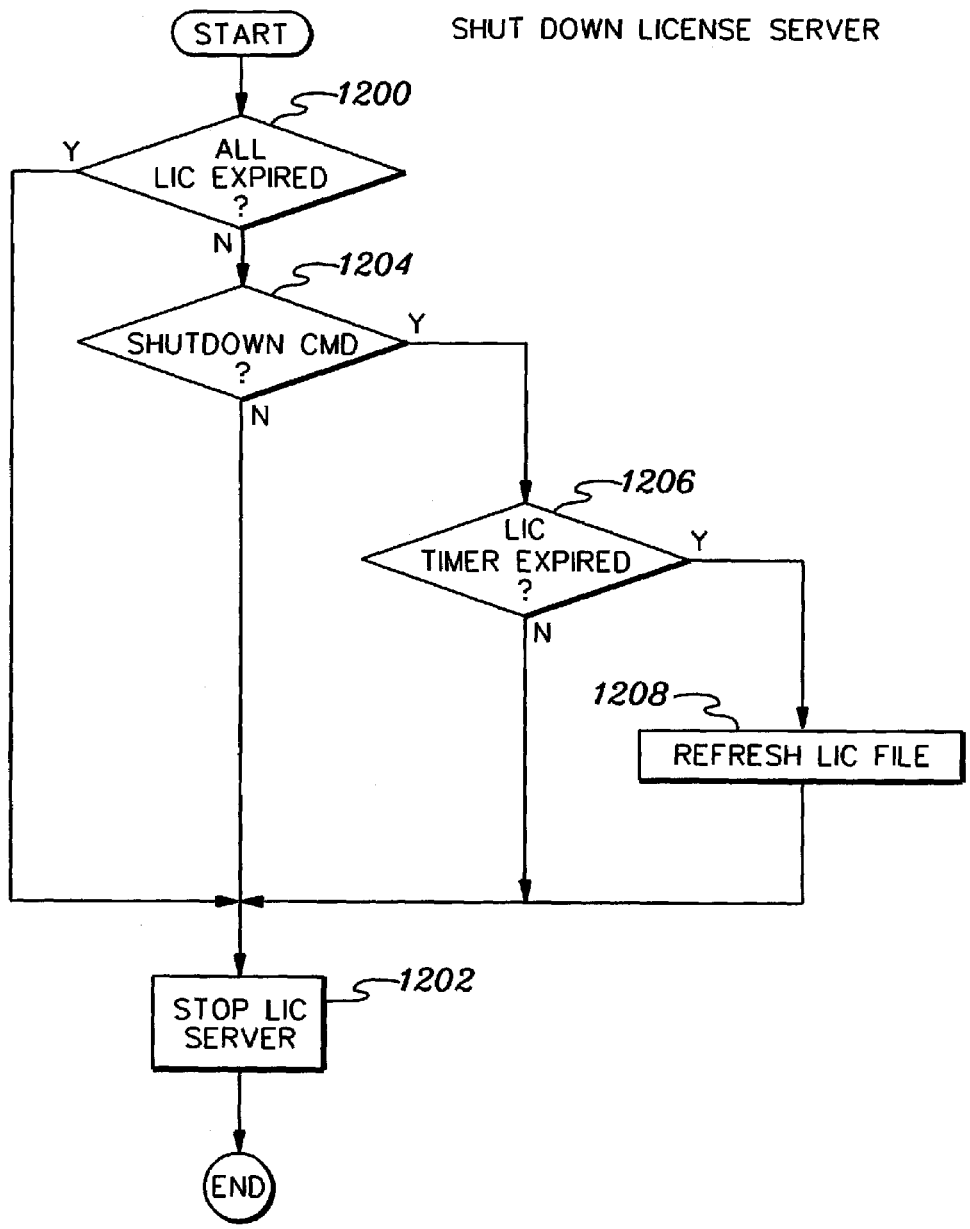
FIG. 12 depicts one embodiment of the logic associated with shutting down a license server, in accordance with an aspect of the present invention.

Referring to FIG. 12, initially, a determination is made as to whether all of the licenses have expired, INQUIRY 1200. If so, then the license server is stopped, INQUIRY 1202. However, if all the licenses have not expired, then a further determination is made as to whether the command is a shut down command, INQUIRY 1204. If not, then once again, the license server is stopped, STEP 1202. On the other hand, if it is a shut down command, then a further determination is made as to whether the license timer has expired, INQUIRY 1206. Should the license timer be expired, then the license server is stopped, STEP 1202. Otherwise, the license file is refreshed, STEP 1208, and then the license server is stopped, STEP 1202.

Figure 13:
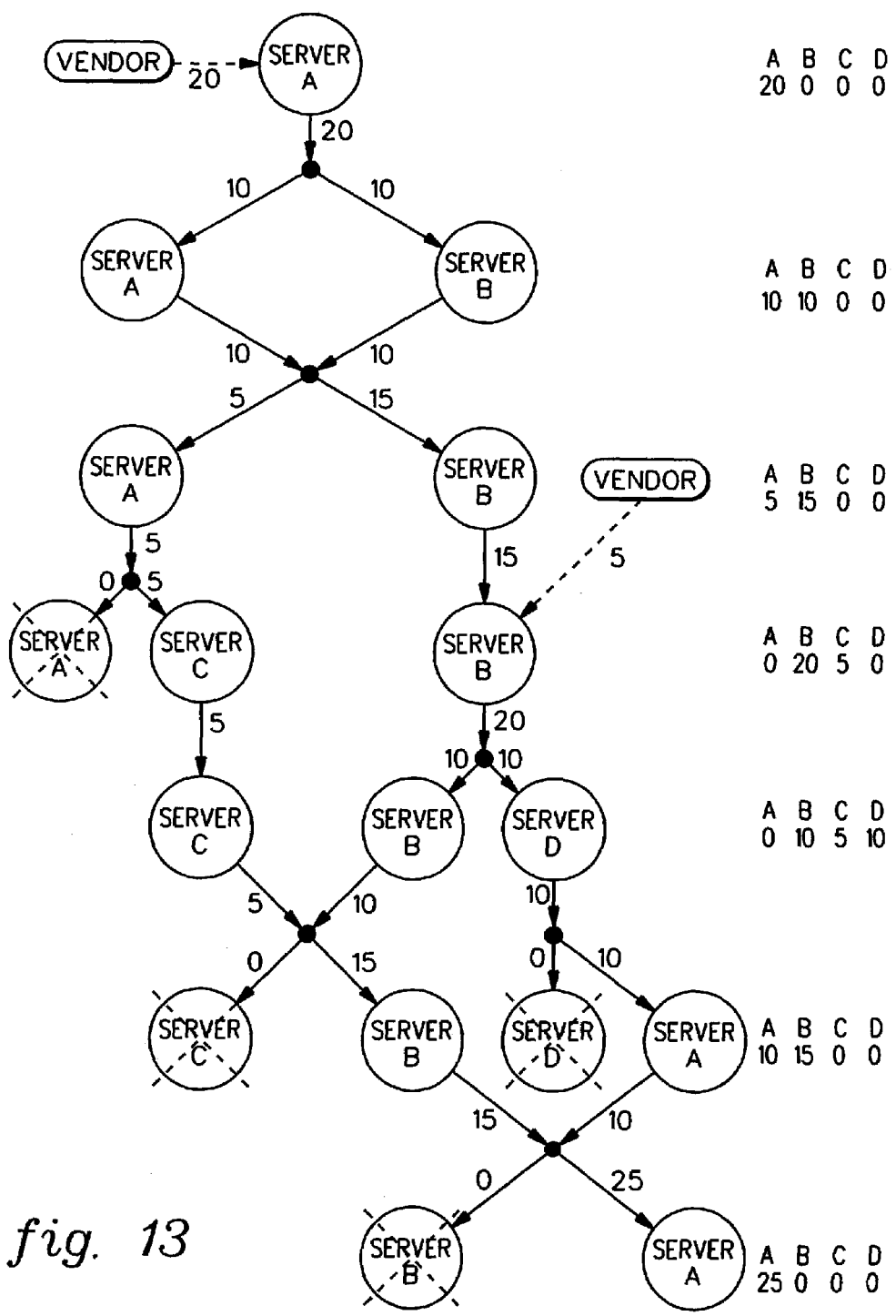
FIG. 13 pictorially depicts various state changes that can occur in a multiple dynamic mode of operation, in accordance with an aspect of the present invention.

Described in detail above is one embodiment of the logic associated with transferring responsibility of one or more licenses of one license server from the one license server to one or more other license servers. Various transitions can occur over time, as shown in FIG. 13, in which the mode of operation is a multiple dynamic mode of operation. In one example, a customer is allowed to specify an initial period where the licenses are bound to a particular license server in the traditional sense of a static license server. Then, once this period expires, if a dynamic license server mode is allowed, the current license server is allowed to enter a dynamic license server mode, where under user command and/or automatic invocation, responsibility for licenses is allowed to be transferred to one or more other license servers (irregardless of where the components, e.g., the software of the licenses, are executed). In one embodiment, after the period expires, there is no valid license file in existence that could be used to start another pool of licenses.

The license file is allowed to age out and become invalid prior to the overall term of the license purchased and a new license file can be dynamically created and administered from license server software that executes on the same or a different host from which the initial set of licenses were administered. This ensures that the vendor asset, the software license represented by the license file, is not duplicated by intentional or unintentional means. It further provides the flexibility to assign responsibility of licenses to meet user specific requirements. Thus, in accordance with an aspect of the present invention, license administration can be reassigned to an arbitrary number of server hosts, while still restricting usage of the asset via a software license, such that the total number of licenses administered remains equal to the number of licenses purchased (as depicted in the tabulated totals to the right in FIG. 13).

Advantageously, one or more aspects of the present invention provide the ability to receive a license file from a vendor either as an initial purchase or to re-establish a pool of licenses; provide the ability to coordinate license files on disk, such that only one valid license file is associated to a particular license at any instance in time; provide the ability for a user to transfer a number of licenses from one license server to another; and the ability to ensure that the history of license file state changes for a customer installation are maintained for accounting or recovery purposes.

Advantageously, a capability is provided that allows for automatic planned migration of license server capability from one physical CPU to another CPU, while still enforcing the vendor's asset protection model of a single copy of the license server code administering a particular license at any given time.

Although an embodiment is described above, this is only one example. Various changes can be made without departing from the spirit of the present invention. For example, in the event a system does not have network connectivity, a transition can be affected by saving the event to a recordable media, sending the request via a separate network addressable host, getting the acknowledgment back on recordable media, and completing the transition using the recordable media response.

The present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A computer implemented method of facilitating the transfer of license administrative responsibilities, said method comprising:

administering by one license server of a computing environment one or more licenses;

determining that ownership of at least one license of the one or more licenses is to be moved from the one license server to another license server of the computing environment; and dynamically transferring from said one license server to the another license server administrative responsibility for the at least one license of the one or more licenses, wherein ownership of the at least one license is relinquished by the one license server and assumed by the another license server, said another license server being selected by an entity other than a vendor of the license, and wherein the transferring ensures multiple administrators of the at least one license is avoided.

2. The method of claim 1, wherein said dynamically transferring comprises transferring the administrative responsibility absent renegotiation with a vendor of the at least one license of which license server is to administer the at least one license.

3. The method of claim 1, where the dynamically transferring comprises:
  receiving acknowledgment from a vendor of the at least one license that a transfer is to take place; and
  subsequently, sending information of the at least one license from the one license server to the another license server in order to enable the another license server to administer the at least one license.

4. The method of claim 1, wherein the dynamically transferring occurs prior to expiration of the at least one license.

5. The method of claim 1, further comprising entering a dynamic mode of operation for the one license server to enable the dynamically transferring.

6. The method of claim 5, wherein the dynamic mode of operation is entered, in response to expiration of a defined amount of time in which administration of the at least one license is tied to the one license server.

7. The method of claim 5, further comprising re-entering by the one license server a static mode of operation.

8. The method of claim 1, wherein the dynamically transferring comprises:
  invalidating at least one license file corresponding to the at least one license prior to transferring the at least one license, the invalidating occurring at a time prior to expiration of the at least one license; and
  creating by the another license server at least one other license file to include the at least one license, wherein the invalidating and creating ensure the at least one license is not administered by multiple license servers.

9. The method of claim 1, wherein the one license server includes code to enable the dynamically transferring, and wherein the dynamically transferring includes transferring the administrative responsibility absent a seeking of authorization from a vendor of the at least one license outside of using the code.

10. A system of facilitating the transfer of license administrative responsibilities, said system comprising:
  a license server of a computing environment to dynamically transfer from the license server to another license server of the computing environment administrative responsibility for at least one license of the license server, the transfer being in response to a determination that ownership of the at least one license is to be moved from the one license server to the another license server, and wherein ownership of the at least one license is relinquished by the one license server and assumed by the another license server, said another license server being selected by an entity other than a vendor of the license, and wherein the transferring ensures multiple administrators of the at least one license is avoided.

11. The system of claim 10, wherein the license server is further adapted to receive acknowledgment from a vendor of the at least one license that a transfer is to take place; and to subsequently, send information of the at least one license to the another license server in order to enable the another license server to administer the at least one license.

12. The system of claim 10, wherein the dynamically transferring occurs prior to expiration of the at least one license.

13. The system of claim 10, further comprising means for entering a dynamic mode of operation for the license server to enable the dynamically transferring.

14. The system of claim 13, wherein the dynamic mode of operation is entered, in response to expiration of a defined amount of time in which administration of the at least one license is tied to the license server.

15. The system of claim 13, wherein to dynamically transfer:
  at least one license file corresponding to the at least one license is invalidated prior to transferring the license, the invalidating occurring at a time prior to expiration of the at least one license; and
  at least one other license file is created by the another license server and includes the at least one license, wherein the invalidating and creating ensure the at least one license is not administered by multiple license servers.

16. At least one program storage device readable by a machine, tangibly embodying at least one program of instructions executable by the machine to perform a method of facilitating the transfer of license administrative responsibilities, said method comprising:
  administering by one license server of a computing environment one or more licenses;
  determining that ownership of at least one license of the one or more licenses is to be moved from the one license server to another license server of the computing environment; and
  dynamically transferring from one license server to another license server administrative responsibility for the at least one license of the one license server, wherein ownership of the at least one license is relinquished by the one license server and assumed by the another license server, said another license server being selected by an entity other than a vendor of the license, and wherein the transferring ensures multiple administrators of the at least one license is avoided.

17. The at least one program storage device of claim 16, wherein the dynamically transferring comprises:
  receiving acknowledgment from a vendor of the at least one license that a transfer is to take place; and
  subsequently, sending information of the at least one license from the one license server to the another license server in order to enable the another license server to administer the at least one license.

18. The at least one program storage device of claim 16, wherein the dynamically transferring comprises:
  invalidating at least one license file corresponding to the at least one license prior to transferring the license, the invalidating occuring at a time prior to expiration of the at least one license; and
  creating by the another license server at least one other license file to include the at least one license, wherein the invalidating and creating ensure the at least one license is not administered by multiple license servers.

19. The at least one program storage device of claim 16, wherein said method further comprises entering a dynamic mode of operation for the one license server to enable the dynamically transferring.

20. The at least one program storage device of claim 19, wherein the dynamic mode of operation is entered, in response to expiration of a defined amount of time in which administration of the at least one license is tied to the one license server.

\* \* \* \* \*